Dec. 17, 1935.  J. G. EBENHACK  2,024,279
VULCANIZING DEVICE
Filed July 20, 1934
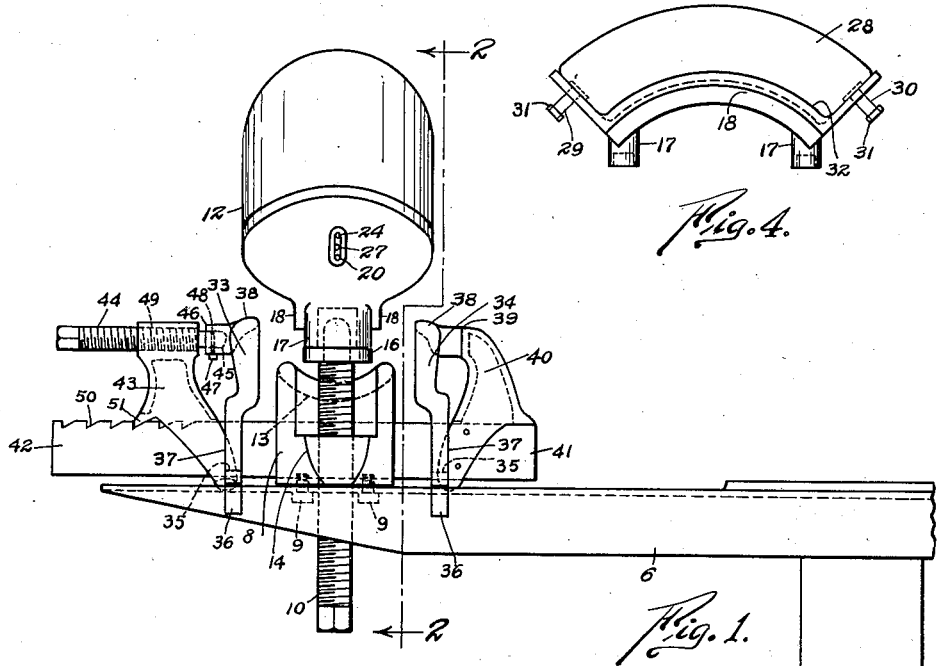
Fig. 4.
Fig. 1.
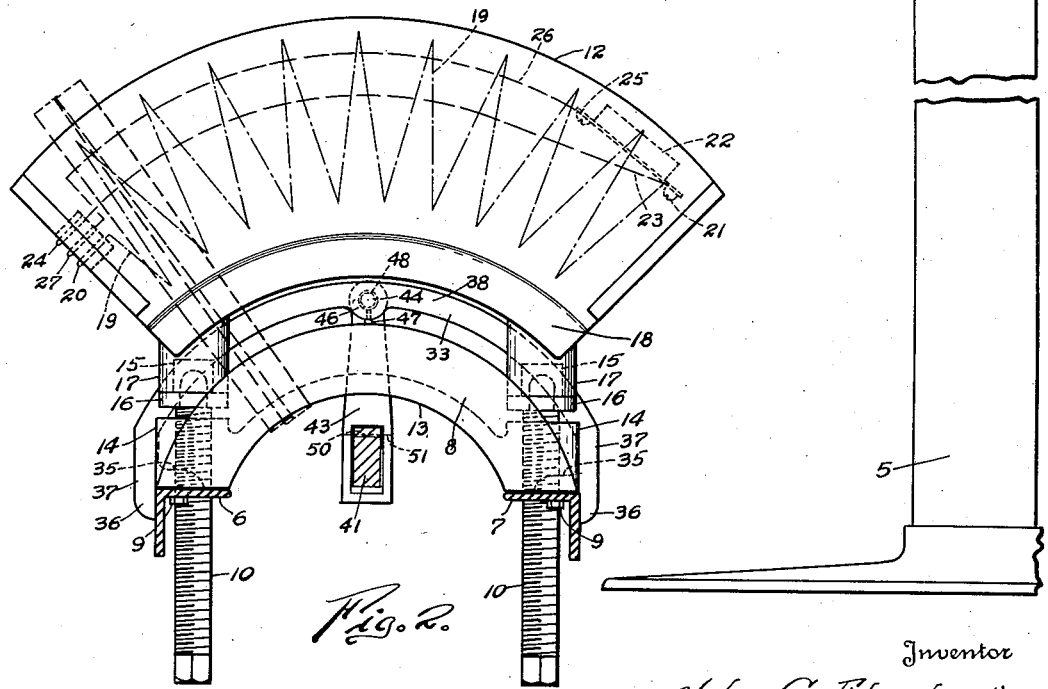
Fig. 2.
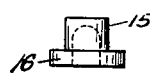
Fig. 3.
Inventor
John G. Ebenhack
By Murray and Zugelter
Attorneys.

Patented Dec. 17, 1935

2,024,279

UNITED STATES PATENT OFFICE 2,024,279

VULCANIZING DEVICE

John G. Ebenhack, Wyoming, Ohio

Application July 20, 1934, Serial No. 736,238

10 Claims. (Cl. 18—18)

This invention relates to a device for vulcanizing pneumatic tire casings, and particularly for the repair thereof.

An object of the invention is to provide a novel vulcanizing device whereby the repair of casings is effected properly and with the expenditure of a minimum of time and effort.

Another object of the invention is to provide a novel, simple, and effective tire casing support in connection with vulcanizing apparatus.

A further object of the invention is to provide a vulcanizing device with a novel wrap-tightener or pressure means which assists considerably in effecting a durable and otherwise satisfactory casing repair.

The foregoing and other objects are attained by the means described herein and disclosed in the accompanying drawing, in which:

Fig. 1 is a fragmental elevational view of the device of this invention, the casing support arm or heating form being in an elevated position upon the adjustment screws or elevators.

Fig. 2 is a cross-sectional view taken on line 2—2 of Fig. 1, showing the arm or form in a lowered position.

Fig. 3 is an elevational view of a bushing which forms a detail of the structure.

Fig. 4 is an elevational view on a small scale, showing a modified form of casing support arm or heating form which may be used in place of the one disclosed in Figs. 1 and 2.

In the drawing, 5 indicates a stand or frame which has fixed to its top portion the pair of spaced rails or supports 6 and 7. The rails or supports may be of angle iron stock secured to the stand, or otherwise supported in spaced parallelism. Spanning the rails, near the free ends thereof, is a wrap-supporting arch or bracket member 8 which is fixed to the rails in any suitable manner such as by means of screws 9. The arch or bracket member 8 is adapted to threadedly support the adjusting screws or elevators 10, which in turn support the casing support arm 12. The screws 10 may be rotated to raise or lower the arm 12 relative to the arch member 8, as illustrated in Figs. 1 and 2, respectively.

With the foregoing explanation, it will be understood that when the arm 12 is lowered to the Fig. 2 position, and a tire casing is placed upon it, a wrapping of tape or the like may be applied to encircle the arm 12, the tire casing supported thereon, and the arch or bracket member 8. After application of the wrap as stated, the screws 10 may be tightened up to elevate the arm 12 relative to member 8, whereupon the wrap will be effectively tightened so as to press the inside of the tire casing into firm contact with the arm 12. The wrap may be either a winding of tape, ribbon, or the like, or a sheet of flexible material fitted about the parts 8 and 12 with the tire casing included. The tire casing and wrap are not illustrated in the drawing, as the application thereof is deemed obvious to those conversant with the art to which the invention relates. It may be stated, however, that the wrap contacts the concave under surface 13 of the bracket 8 and the convex outer surface of a tire casing supported upon the arm 12, the wrap being wide or narrow depending upon the size of the area to be vulcanized. It is to be observed that the arcs of members 8 and 12 are made substantially concentric so that the wrap will remain in place when tightened by means of the screws 10. The screws provide for independently elevating the opposite ends of the arm 12 so that the pressure of the wrap upon a tire casing may be varied or adjusted, or equalized.

As stated above, the wrap-supporting arch member 8 is fixed to the rails 6 and 7. The bosses 14 of said member are bored and threaded internally to receive the screws 10. The upper ends of the screws are received in the hollow bushings 15, the flanges 16 of which abut the bosses 17 of the casing support arm. By means of this construction, the opposite ends of said arm may be elevated or lowered independently, within limits, by means of the screws 10.

The casing support arm 12 preferably is hollow and it includes any suitable heating means. The arm 12 of Fig. 2 is electrically heated, whereas the one shown in Fig. 4 is adapted to be heated by means of hot gas or vapor, preferably steam. In Fig. 2, the heating arm is constructed of metal and is shaped to fit within a tire casing. The lower part of the arm has opposed arcuate bearing portions 18 adapted to support the bead portions of a tire casing. The hollow interior of the arm 12 contains a suitable resistance wire 19 which is electrically connected to a terminal 20 at one end, and to one terminal 21 of a thermostatic switch 22 at its other end. Said terminal 21 also has a lead wire 23 which connects with a terminal 24. The second terminal 25 of the switch is connected to a conductor 26 which is connected to a terminal 27. When the terminals 20—24—27 are connected to a source of electricity, the resistance wire 19 heats the arm until a predetermined temperature suitable for vulcanizing purposes is attained, and thereafter the thermostatic switch operates intermittently to maintain the desired temperature.

The arm of Fig. 4 may be applied in place of the arm 12 as it includes the same type of supporting means. The Fig. 4 arm, however, includes a flexible sack or body 28 of rubber or the like which is adapted to expand within the tire casing when hot gas or steam under pressure is introduced through one of the ports 29 or 30. One port is an inlet, and the other an outlet for the heating medium. Suitable couplings 31 are provided to effect the necessary connections with the exhaust and inlet pipes. The sack or body 28 may be supported upon a suitable cradle structure 32 which forms part of the arm. It is to be understood that the arms shown in Figs. 4 and 2 are interchangeable.

The utility of the device of this invention is greatly enhanced by the provision of means for applying an inward force to the wrap in the region of the tire bead. For this purpose, there is provided a pair of arcuate compression bars 33 and 34 each of which has a pair of guides or feet 35 which ride upon the rails 6 and 7. Lateral movement of the compression bars is prevented by the depending extensions 36 on the legs 37 of the bars. The span or top portion 38 of each compression bar has an arcuate formation conforming substantially with the arc of the arm 12, and consequently the compression bars are adapted to apply pressure to the wrap along a curved line concentric with the bead of a tire mounted upon the support arm 12.

Both of the compression bars rest upon the rails and may slide lengthwise thereof. The bar 34 is welded or otherwise fixed, as at 39, to a jaw member 40 which in turn is pinned, welded or otherwise fixed upon one end of a clamp bar or tongue 41. The member 41 extends forwardly beneath the compression bars and member 8, in substantial parallelism with the rails 6 and 7. The forward end 42 of the clamp bar has adjustably mounted thereon the adjustable jaw 43 which carries an adjusting screw 44. The inner end of said screw is mounted for rotational movement in a socket 45 provided in a boss 46 which is integral with and extended from the mid-point of the span of compression bar 38. The socket end of the screw 44 preferably is rendered normally inseparable from the compression bar by means of a screw or pin 47 which extends into an annular groove 48 near the end of the screw, this construction permitting rotation of the screw but precluding removal thereof from the socket. An internally threaded bore 49 in the jaw 43 receives the threads of screw 44, thereby providing for adjustment of the compression bar 38 toward and from the jaw 43. The connections between each compression bar and its associated jaw function to hold the compression bars in substantially parallel and vertical positions, however, the single point mountings between the jaws and compression bars provide the necessary flexibility to allow full and even seating of the compression bars against the wrap when the screw 44 is tightened to force the compression bars toward the wrap at opposite sides of the heating form or arm 12. Any suitable means may be provided for adjustably fixing the movable jaw 43 at various locations along the clamp bar end 42, there being shown for the purpose a series of notches 50 in the clamp bar for reception of a dog or lug 51 on the jaw. The adjustable jaw structure 43—44—33 shall be removable bodily from the clamp bar at end 42, so that the clamp bar may swing downwardly or pivot about the feet 35 of compression bar 34, thereby affording ample and unrestricted space all around the wrap support 8 to permit quick and accurate application or removal of the wrap relative to the members 8 and 12. As is obvious, the clamp bar 41 and its associated parts 40—34 may be removed bodily from the rails, if desired, after detaching the adjustable jaw structure 43—44—33.

The compression bar structure herein described is self-adjusting to the extent that it applies equal force to the wrap at opposite sides of the arm 12, due to the free sliding movement of the compression bars upon the rails. It is intended that the rails 6 and 7 shall extend to the right of the standard 5 for a distance sufficient to enable a second complete vulcanizing unit to be applied thereto; however, the rails 6 and 7 may be supported and extended from a wall or other suitable supporting structure.

It is to be understood that various modifications and changes in the structural details of the device may be made, within the scope of the appended claims, without departing from the spirit of the invention.

What is claimed is:

1. In a device of the class described the combination of a supporting structure including an arcuate supporting arm for a tire casing, mounted upon the supporting structure, and means to heat the arm to a temperature suitable for vulcanizing purposes, a wrap-supporting arch mounted upon the supporting structure adjacent to said arm, means for increasing the distance between the arm and the said arch after application of a wrap encircling the arch, the arm, and the tire casing supported upon said arm, whereby to tension the wrap and press the tire casing firmly against the arm, and means including a self-equalizing clamp freely movable bodily along the supporting structure, for applying pressure to the wrap at opposite sides of the arm, to force the beads of the tire casing into firm contact with the arm.

2. In a device of the class described the combination of a rail structure comprising spaced substantially horizontal rails, an arcuate supporting arm for a tire casing mounted transversely to the rails, and means for heating the arm to a temperature suitable for vulcanizing purposes, a wrap-supporting arch member mounted upon the rails, means for varying the distance between said arm and arch member, a pair of bead compressing members at opposite sides of the arm, means supporting said compressing members for limited bodily movement lengthwise of the rails and means for adjusting the bead compressing members toward and from each other.

3. In a device of the class described the combination of a rail structure comprising spaced substantially horizontal rails, an arcuate supporting arm for a tire casing mounted transversely to the rails, and means for heating the arm to a temperature suitable for vulcanizing purposes, a wrap-supporting arch member mounted upon the rail structure, means for varying the distance between said arm and arch member, a pair of bead compressing members at opposite sides of the arm, means supporting said compressing members for limited bodily floating movement lengthwise of the rails, means for adjusting the bead compressing members toward and from each other, and a separable connection associated with one of the bead compressing members to afford disposition of both said members remote from the wrap-supporting arch member.

4. In a device of the class described the combination of a support including a track, an arcuate supporting arm for a tire casing mounted transversely to the track, and means for heating the arm to a temperature suitable for rubber curing purposes, a wrap and means for tightening the wrap about a portion of the arm and a portion of the tire casing supported upon the arm, and means slidable bodily along the track for applying equal opposed forces laterally upon the wrap surfaces to force the sides of the tire casing with equalized pressure, into close contact with the arm.

5. In a device of the class described the combination of a supporting structure including spaced parallel rails having free ends and anchored ends, an arcuate wrap-supporting member fixed transversely upon the rails and spanning them near the free ends of the rails remote from the anchored ends thereof, to provide a free space between the rails of a width approximating the span of the wrap-supporting member, for allowing unobstructed application of a wrap about the wrap-supporting member, a tire-casing support arm spanning the wrap-supporting member, means for heating said arm, and means for moving the opposite ends of said arm toward and from the wrap-supporting member.

6. In a device of the class described the combination of a supporting structure including spaced parallel rails having free ends and anchored ends, an arcuate wrap-supporting member fixed transversely upon the rails and spanning them near the free ends of the rails remote from the anchored ends thereof, to provide a free space between the rails, of a width approximating the span of the wrap-supporting member, for allowing unobstructed application of a wrap about the wrap-supporting member, a tire-casing support arm spanning the wrap-supporting member, and means for heating said arm, means for independently moving the opposite ends of said arm toward and from the wrap-supporting member, and a removable clamp structure supported entirely by the rails for limited free sliding movement longitudinally of the rails, said clamp structure including arcuate compression members disposed at opposite sides of the tire casing support arm.

7. In a device of the class described the combination of a supporting structure including spaced parallel rails having free ends and anchored ends, an arcuate wrap-supporting member fixed transversely upon the rails and spanning them near the free ends of the rails remote from the anchored ends thereof, to provide a free space between the rails, of a width approximating the span of the wrap-supporting member, for allowing unobstructed application of a wrap about the wrap-supporting member, a tire-casing support arm spanning the wrap-supporting member, and means for heating said arm, means for independently moving the opposite ends of said arm toward and from the wrap-supporting member, and a removable clamp structure supported entirely by the spaced rails for limited free sliding movement longitudinally of the rails, said clamp structure including arcuate compression members disposed at opposite sides of the tire casing support arm, the compression members being extended to an elevation above the arcuate wrap-supporting member.

8. As a new article of manufacture, a clamp assembly comprising in combination a longitudinal clamp bar, an upwardly extended support fixed upon the bar near one end thereof, an arcuate compression bar having depending legs at the opposite ends thereof, guide means at the lower ends of the legs for supporting the compression bar upon spaced supports, means for fixing the mid-point of the compression bar to said extended support at right angles to the clamp bar, a movable jaw mounted for adjustment near the opposite end of the clamp bar, an adjustment screw carried by the movable jaw and extending in substantial parallelism with the clamp bar, a second arcuate compression bar, and means for rotatably supporting said second bar upon an end of the screw transversely thereof.

9. A clamp for tire treating apparatus comprising in combination a longitudinal clamp bar, an upwardly extended support fixed upon the bar near one end thereof, an arcuate compression bar having depending legs at the opposite ends thereof, guide means at the lower ends of the legs for supporting the compression bar upon spaced supports, the arcuate compression bar having its midpoint fixed to said extended support substantially at right angles to the clamp bar, a jaw mounted for adjustment near the opposite end of the clamp bar and a second arcuate compression bar carried by the last mentioned jaw, and guide means for supporting the second arcuate compression bar in opposition to the first compression bar.

10. A clamp for tire treating apparatus comprising in combination a longitudinal clamp bar, an upwardly extended support fixed upon the bar near one end thereof, an arcuate compression bar having depending legs at the opposite ends thereof, guide means at the lower ends of the legs for supporting the compression bar upon spaced supports, the arcuate compression bar having its midpoint fixed to said extended support substantially at right angles to the clamp bar, a jaw mounted for adjustment near the opposite end of the clamp bar and a second arcuate compression bar carried by the last mentioned jaw, guide means for supporting the second arcuate compression bar in opposition to the first compression bar, and means for advancing the second compression bar relative to the movable jaw.

JOHN G. EBENHACK.